(12) United States Patent
Fletcher et al.

(10) Patent No.: US 8,495,160 B2
(45) Date of Patent: Jul. 23, 2013

(54) SYSTEM FOR CONTROLLING RETENTION OF DATA MESSAGES

(75) Inventors: Benjamin J. Fletcher, West Yorkshire (GB); Gareth E. Jones, Hampshire (GB); Matthew R. Whitehead, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 423 days.

(21) Appl. No.: 12/301,230

(22) PCT Filed: Feb. 23, 2007

(86) PCT No.: PCT/EP2007/051751
§ 371 (c)(1),
(2), (4) Date: Nov. 17, 2008

(87) PCT Pub. No.: WO2007/134885
PCT Pub. Date: Nov. 29, 2007

(65) Prior Publication Data
US 2010/0023587 A1 Jan. 28, 2010

(30) Foreign Application Priority Data
May 19, 2006 (GB) .................................. 0609997.2

(51) Int. Cl.
*G06F 15/16* (2006.01)
(52) U.S. Cl.
USPC ............ 709/207; 709/201; 709/203; 709/217
(58) Field of Classification Search
USPC .................. 709/206, 207, 201, 203, 205, 217
See application file for complete search history.

(56) References Cited

U.S. PATENT DOCUMENTS

| | | | |
|---|---|---|---|
| 6,192,219 B1 * | 2/2001 | Tada | 340/7.52 |
| 7,349,980 B1 * | 3/2008 | Darugar et al. | 709/238 |
| 8,082,554 B2 * | 12/2011 | Craggs et al. | 719/318 |
| 8,195,757 B2 * | 6/2012 | Fletcher et al. | 709/207 |
| 8,200,740 B2 * | 6/2012 | Banks et al. | 709/201 |
| 2002/0178273 A1 * | 11/2002 | Pardo-Castellote et al. | 709/230 |
| 2002/0199121 A1 * | 12/2002 | Stanford-Clark | 713/201 |
| 2003/0009511 A1 * | 1/2003 | Giotta et al. | 709/201 |
| 2003/0041304 A1 * | 2/2003 | Numata et al. | 715/513 |
| 2004/0181588 A1 * | 9/2004 | Wang et al. | 709/207 |

(Continued)

OTHER PUBLICATIONS

IBM, WebSphere MQ Publish/Subscribe User's Guide Version 6.0, First edition (May 2005); 1-195.*
IBM, WebSphere Message BrokerPublish/Subscribe Version 6 Release 0, Third Edition (Mar. 2006); 1-114.*

(Continued)

*Primary Examiner* — Abdullahi Salad
*Assistant Examiner* — Jimmy H Tran
(74) *Attorney, Agent, or Firm* — Steven L. Nichols; Van Cott, Bagley, Cornwall & McCarthy P.C.

(57) ABSTRACT

Subscribers connected to a publish/subscribe message broker receive messages on topic names to which they have subscribed. The subscribers receive any number of messages on each topic to which they have subscribed. When the broker receives a message on a second, pre-specified, topic, associated with a first topic, the broker removes any existing retained message related to the first topic. Thus any subsequent subscribers to the first topic do not receive the retained message when they subscribe, and thus do not receive out-of-date information. If, at a later date, a new message is published on the first topic subscribers will receive the new message if they are still subscribed.

21 Claims, 5 Drawing Sheets

U.S. PATENT DOCUMENTS

| | | | |
|---|---|---|---|
| 2006/0069587 A1* | 3/2006 | Banks et al. | 705/1 |
| 2006/0106810 A1* | 5/2006 | Edwards et al. | 707/10 |
| 2006/0136256 A1* | 6/2006 | Roots et al. | 705/1 |
| 2006/0156382 A1* | 7/2006 | Motoyama | 726/1 |
| 2007/0088711 A1* | 4/2007 | Craggs | 707/10 |
| 2007/0280381 A1* | 12/2007 | Amini et al. | 375/340 |
| 2008/0294794 A1* | 11/2008 | Darugar et al. | 709/238 |
| 2009/0177753 A1* | 7/2009 | Banks et al. | 709/206 |

OTHER PUBLICATIONS

Rooney, Sean et al.; "Distributed Messaging Using Meta Channels and Message Bins"; 2005 9th IFIP/IEEE International Symposium; May 15, 2005; pp. 703-716; IEEE; Piscataway, NJ U.S.A.

Eugster, Patrick Th. et al.; "The Many Faces of Publish/Subscribe"; AMC Computing Surveys; Jun. 2003; pp. 114-131; vol. 35; No. 2; AMC; New York, NY U.S.A.

* cited by examiner

SYSTEM FOR CONTROLLING RETENTION OF DATA MESSAGES

RELATED APPLICATIONS

This application is a National Phase application claiming the benefit of International Application No. PCT/EP2007/051751, filed 23 Feb. 2007, which claims priority based on European Patent Application No. 0609997.2, filed 19 May 2006, which is incorporated herein by reference in its entirety.

BACKGROUND

The present specification relates to apparatus, methods and computer programs for controlling retention of data messages in a publish/subscribe messaging environment. A publish/subscribe messaging environment is typically an asynchronous messaging paradigm where publishers do not send their messages directly to specific receivers. Rather, the published messages are characterized into classes. The subscribers express interest in one or more classes and receive messages within these classes. Many conventional publisher-subscriber models used fixed, pre-named classes to decouple the publishers and subscribers (for example "stock\IBM"). In these publisher-subscriber models, the publishers and subscribers are unaware of each other's existence. These classes may be created using a variety of methods, including filtering the published messages by topic or by content. In topic-based filtering, the publisher is responsible for assigning the message to a particular topic. In content-based filtering, the subscriber specifies content attributes that define content they wish to receive. Publish/subscribe systems may support topic-based filtering, content-based filtering, both, or a hybrid of the topic and content based filtering.

In many situations, the publish/subscribe model is facilitated by an intermediary broker who serves as a repository for published messages and performs filtering and distribution functions. By only loosely coupling the publishers to the subscribers through a broker, the publishers and subscribers can operate independently from each other. Further, because the broker handles the implementation of the publish/subscribe system, the publishers and subscribers can utilize the system without a knowledge of the system details. Additionally, the publication/subscription model can provide better scalability than the traditional client-server topologies.

Normally, a publication is deleted after a copy has been delivered to all subscribers. However, in some situations publications are 'retained' by the broker, maintaining a copy of a message even after it has delivered it to all subscribers. A retained publication allows a subscriber to asynchronously request the retained publication instead of relying on it being delivered by the pub/sub broker. These types of messages normally contain state information, and are also referred to as state publications.

A retained message, such as one containing state information, can become out-of-date or otherwise incorrect. For example, a message concerning the time at which an event will take place may no longer be useful, and indeed may even be confusing, to any subscriber once the event has already taken place. Thus, a mechanism for removing such retained publications is required.

One known mechanism for this comprises specifying an expiry time in the message, which tells the broker that the publication is to expire at a particular time or in a certain number of minutes. However, this is inflexible as the expiry time must be preset when the message is sent. Another known mechanism comprises the manual deletion of the message once it becomes known that this is out of date. However, this mechanism can be onerous, time-consuming and slow. The present specification addresses these problems.

SUMMARY

One aspect of the present specification provides a method for controlling the retention of a published message in a publish/subscribe system. The method comprises the steps of assigning a stop topic attribute to a first message; publishing said first message; listening for a second published message having at least one topic attribute which matches the stop topic attribute of the first published message; and retaining the first published message until such second published message is detected.

Another embodiment of the present specification provides a method for automatically removing a retained publication in a pub/sub system by publication of a message under a related topic. A new publish mechanism is proposed whereby a broker continues publishing a topic indefinitely as a retained publication until a related 'stopping' publication is published. A first 'stoppable' publication, e.g. called 'topic1', has assigned to it a 'stop topic' attribute, e.g. topic2, which identifies a related topic, the publication of which will cancel the topic1 publication. When a new message is published a check is made to see if there are any retained publications which have a 'stop topic' attribute which matches the topic of the new message. If so, then those matching retained publications are removed. Thus, going back to the previous example, when a message labelled 'topic2' is published, the related 'topic' message will be automatically removed. The checks may be done by the pub/sub broker. Alternatively, an application may be configured to subscribe to a 'stop' topic (topic2) in order to receive published messages which indicate when to remove retained publications.

The step of removing a message may comprise deleting the retained message from a message store or replacing the content of the retained message with a blank message (null field).

The steps of the methods and components of the systems as described above may be implemented in computer program code, which controls the performance of operations on a data processing apparatus on which the code executes. A computer program may be made available as a program product comprising program code recorded on a recording medium or available for download via a data transfer medium.

DESCRIPTION OF DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
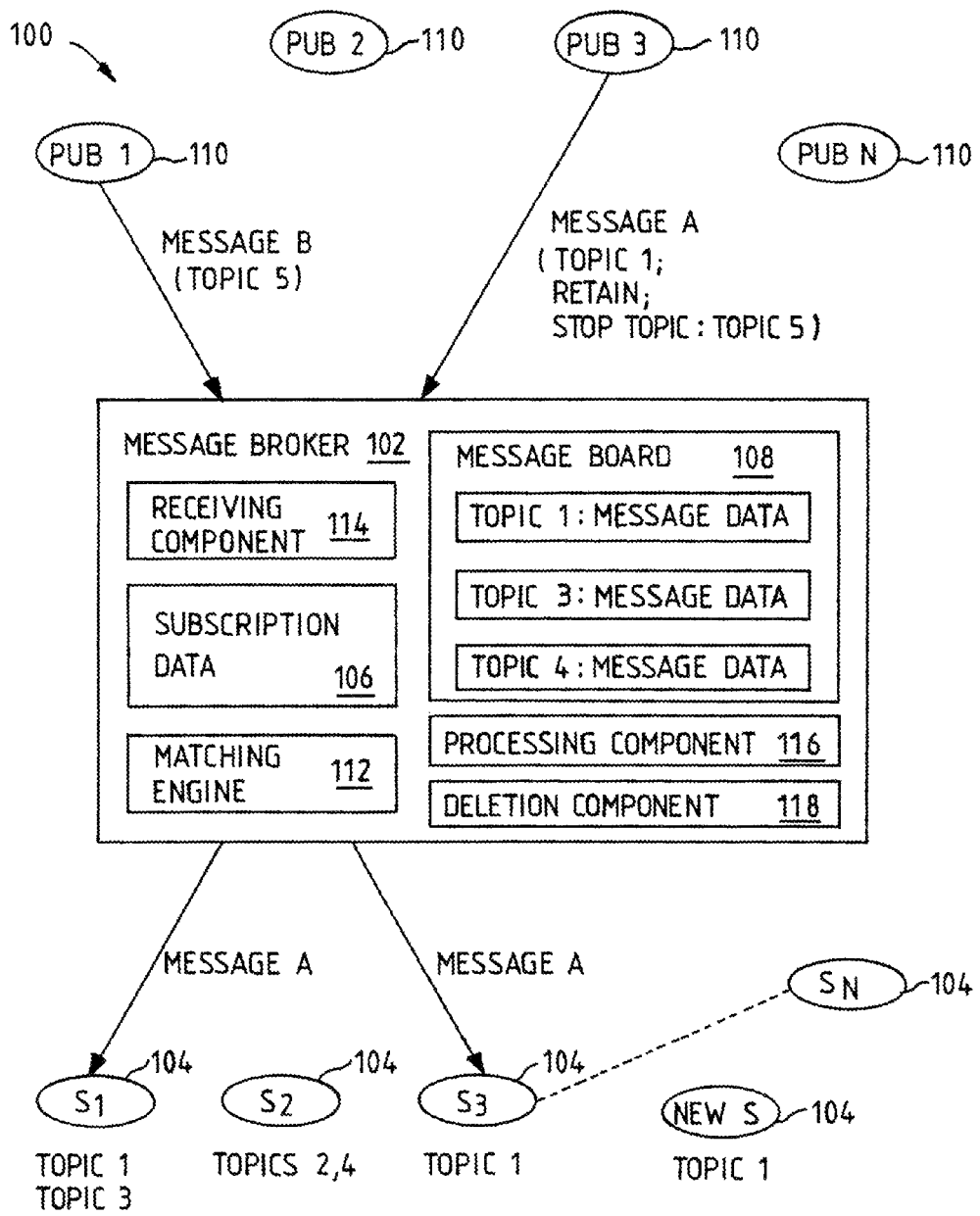
FIG. 1 is a representation of a typical publish/subscribe environment according to an embodiment of the principles described herein.

As will be appreciated by one of skill in the art, the present specification may be embodied as a method, system, or computer program product. Accordingly, the present specification may take the form of an entirely hardware embodiment, an entirely software embodiment (including firmware, resident software, micro-code, etc.) or an embodiment combining software and hardware aspects all generally referred to herein as a "circuit" or "module." Furthermore, the present specification may take the form of a computer program product on a computer-usable storage medium having computer-usable program code embodied in the medium.

Any suitable computer-usable or computer-readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-usable or computer-readable would include the following: an electrical connection having one or more wires, a portable computer diskette, a hard disk, a random access memory (RAM), a read-only memory (ROM), an erasable programmable read-only memory (EPROM or Flash memory), an optical fibre, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present specification may be written in an object oriented programming language. However, the computer program code for carrying out operations of the present specification may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present specification is described below with reference to flowchart illustrations and/or block diagrams of methods, apparatus (systems) and computer program products according to embodiments of the specification. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is provided a pub/sub messaging system 100 comprising a plurality of publisher software applications 110, a central message broker software application 102 and a plurality of subscriber software applications 104. Typically, the publisher 110, central message broker 102, and subscriber 104 software applications all operate on different computers and communicate with each other via the Internet.

The system 100 is based on a publish-subscribe model in which publishers transmit messages together with topic names (either within a message header or within the message content) and subscribers specify the topics that are of interest to them. The subscriber software applications 104 are able to receive data messages on a particular topic from the message broker application 102 by first sending a message to the message broker software application 102 subscribing to that particular topic. On the other side, the publisher software application 110 can send data messages to the message broker software application 102 and specify a particular topic to enable publication to those subscribers 104 who have registered an interest in that particular topic. Furthermore, the subscriber software applications 104 can terminate their subscription to data messages on a topic at any time by sending an unsubscribe message for that topic to the message broker application 102.

Data identifying the subscriptions registered by each subscriber are held by the message broker as subscription data 106. As shown in FIG. 1, subscriber S1 has subscribed to topics 1 and 3, subscriber S2 to topics 2 and 4 and subscriber S3 has subscribed to topic 1. The publishers PUB1, PUB2, PUB3, . . . PUBN transmit data messages for publication to the subscribers via the message broker. Each data message sent is referenced by a topic name, and may also have associated attributes.

Typically, the message broker software application 102 conceptually maintains a hierarchical structure of topics into which publisher software applications 110 can publish messages, and the subscriber software applications 104 can subscribe to explicit topics and sub-trees of the hierarchy. This hierarchical structure of topics is in the form of a tree structure comprising nodes and leaf nodes, where each node of the structure corresponds to a particular topic into which data messages can be published. This tree structure also contains a list of subscribers for each topic.

When a publication is received by the message broker software application 102, a matching engine 112 of the broker searches for matching subscriptions to determine the set of subscribers who have registered an interest in the topic associated with that particular publication. The message broker software application 102 then forwards the publication to this set of subscribers.

Usually, once a copy of the publication has been delivered to all relevant subscribers the broker deletes the message. However, publishers can indicate a request that the broker retains the publication by including a 'retain' attribute in the message header or content. Instead of deleting such publications, the message broker maintains a copy of the message in memory, shown in FIG. 1 as a message board 108.

This means that when new subscribers register with the message broker, if their subscription data indicates that they are interested in any of the retained topics, they will be sent the associated stored message. In the example shown in FIG. 1, message broker 102 has a message board on which messages for Topics 1, 3 and 4 are retained. Thus, when a new subscriber registers with the message broker indicating an interest in any of these retained topics, or indeed when an existing subscriber registers a new interest in a retained topic, it will be sent the current retained message for that topic.

Figure 2:
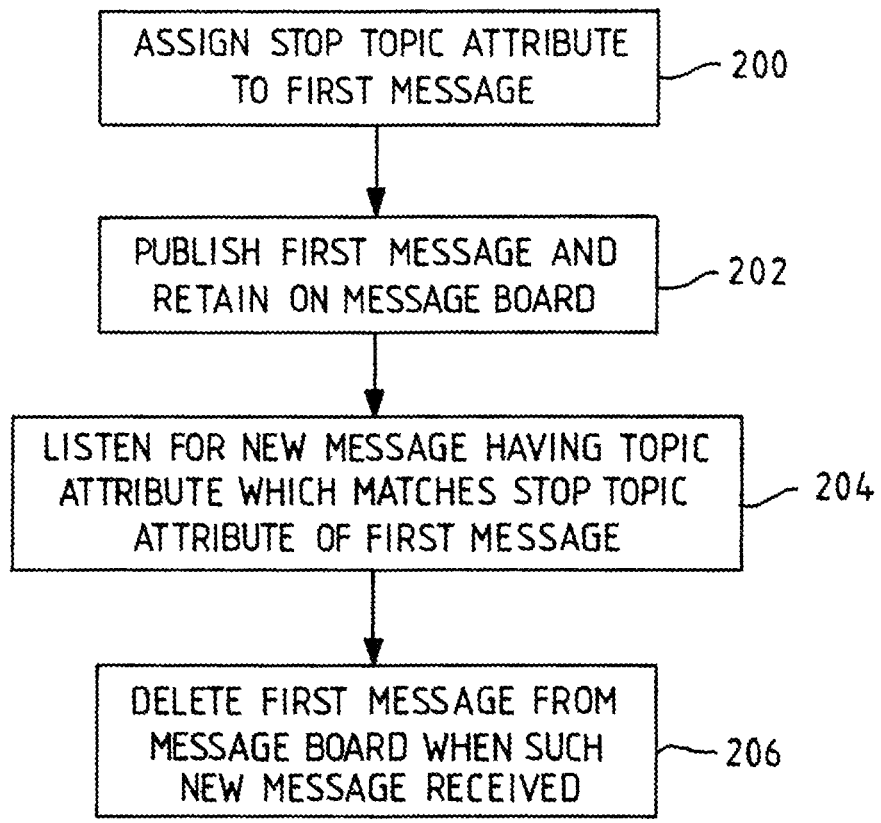
FIG. 2 shows a flowchart of the steps involved in a method according to an embodiment of the principles described herein.

Referring to FIG. 2, a method of controlling the retention of a data message in a publish/subscribe system comprises assigning (step 200) a stop attribute to a first message; publishing and retaining (step 202) said first message; listening (step 204) for a second message having a topic attribute which matches the stop attribute of the first published message; and removing (step 206) the first published message when such second message is received.

The message broker 102 may also comprise a receiving component 114, a processing component 116, and a deletion component 118; the function of which will be described below.

Figure 3:
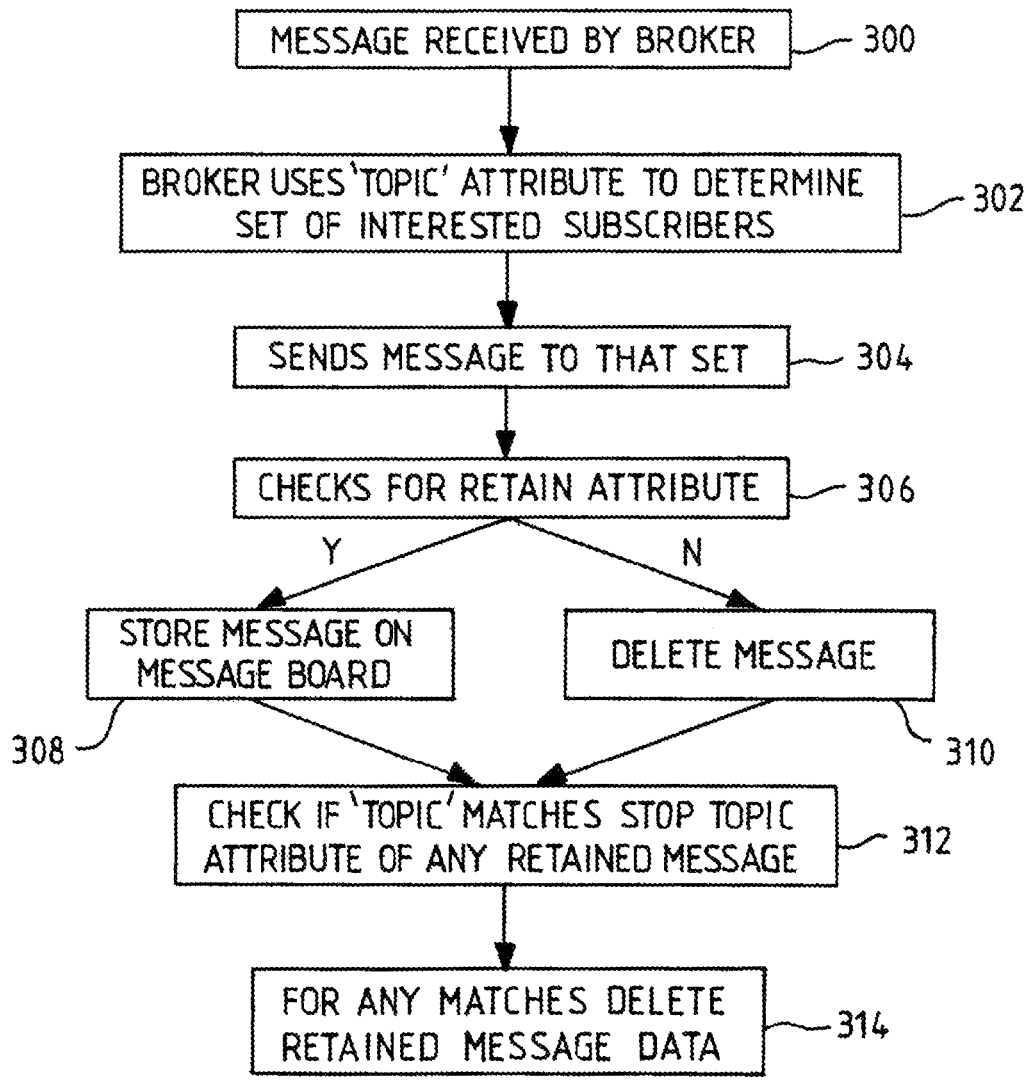
FIG. 3 shows a flowchart of the steps involved in a method according to an embodiment of the principles described herein.

An embodiment of the method will now be described in more detail with reference to FIGS. 1 and 3. First of all the publisher prepares a message for publication by the broker. The prepared message contains a header, comprising metadata identifying at least one attribute of the message, such as the topic to which the data relates, and a data portion comprising the message to be published. If the publisher assigns a 'stop topic' attribute to the message, this will also be included in the header portion of the message.

When a message is received (step 300) from a publisher by the receiving component 114 of the broker, the broker's matching engine 112 uses (step 302) the 'topic' attribute of the message to determine the set of subscribers interested in the message, and the broker then sends (step 304) the message to this set of subscribers.

The message broker's processing component 116 will check (step 306) to see whether the message has a 'retain' attribute, indicating that the message should be stored on the broker's message board. If it finds a retain attribute, the broker adds (step 308) the message to its message board, storing both the data portion as well as any 'stop' attribute received with the message. If there is already a message under the same topic name retained on the message board, the broker will automatically overwrite the old message with the newly received message. If the broker determines that there is no retain attribute then, after having sent the message to any interested subscribers, it deletes (step 310) the message.

The broker also checks (step 312) whether any of the retained messages currently on its message board have 'stop topic' attributes which match the topic of the new message. If they do, then the broker removes (step 314) at least the data portion of those retained messages, using its deletion component 118. Then any new subscribers to the original retained topic will receive only a blank message or no message at all.

A practical example of an application where the method and system of the present specification could be useful is in the use of a pub/sub system for the provision of train departure information. For example a topic of interest may be "Winchester/Waterloo/20:42" (referred to later as 'topic1' for convenience), under which information about the Winchester to Waterloo train, scheduled to depart Winchester at 20:42, is published. Subscribers who wish to receive information about this train register with the broker, and when a new message on this topic is received by the broker it will be sent to the set of interested subscribers. An example of a data portion of a message which may be published under this topic is: "The 20:42 train for Waterloo will depart from Platform 2". The message is retained by the broker so that new users arriving at the station can subscribe to this topic and receive this information.

However, once the train has departed the retention of this message on the message board may cause subscribers to continue waiting on platform 2 after the train has left. To avoid this, the first message is assigned a 'stop topic' attribute, typically the name of a different topic, which may not be a topic of which the broker has yet seen. For example, the 'stop topic' attribute may be the topic: "Winchester/Waterloo/20:42/departed", (referred to hereinafter as 'topic2'). On departure of the 20:42 train to Waterloo, a message having topic2 and with a data portion such as "The 20.42 train for Waterloo has departed" may be published to the broker. The broker will forward this new message to any subscribers who have registered an interest in topic2, (if there are any), and, if the new message has a retain attribute, it will store the new message on its message board. The broker then carries out a check to see if any of its retained messages have a 'stop topic' attribute matching the topic of the new received message, that is, topic2. When it finds that the first message has topic2 listed as a stop topic attribute, the broker deletes the data portion of the first message (i.e. replaces it with a null field). This means that any new subscribers to the first topic, topic 1, arriving at the station once the train has departed will now receive the blank message or no message at all, and will thus not be confused by an out of date message.

Figure 4:
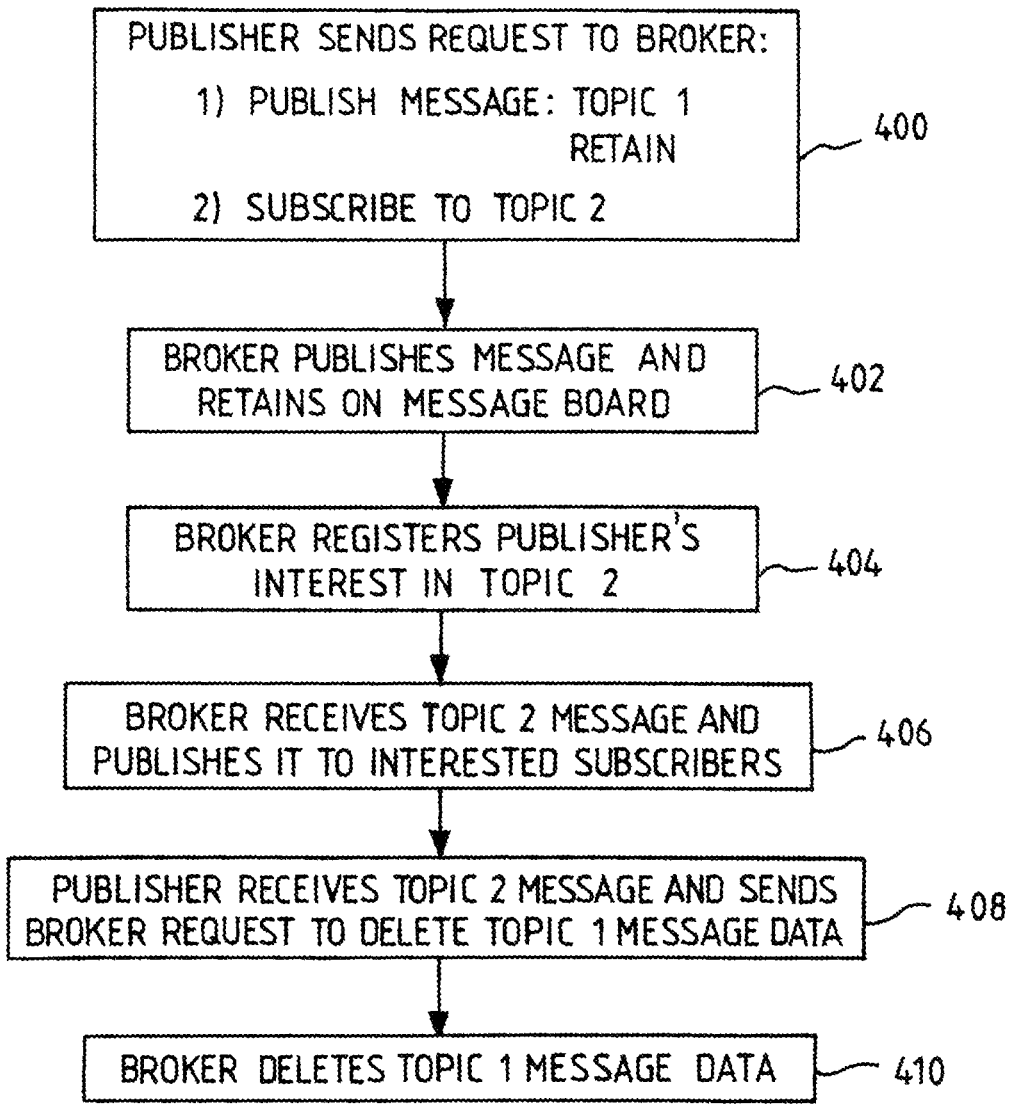
FIG. 4 shows a flowchart of the steps involved in a method according to another embodiment of the principles described herein.

In an alternative embodiment of the present specification, instead of the broker carrying out a check to see whether any retained messages have a matching stop topic attribute, the removal of a retained publication is controlled by the original publisher. An example of a method according to this embodiment will now be described with reference to FIG. 4. When a publisher 100 sends (step 400) a message, to which it has assigned a 'stop topic' attribute, such as topic2, to the message broker for publication, it also sends a request to subscribe to that topic, i.e. to topic2. The publisher thus listens for published messages having a topic attribute which matches the stop topic attribute (topic2) of the first published message.

On receipt by the broker of the request, the broker publishes (step 402) the received message to the set of interested subscribers and also registers (step 404) the interest of the publisher in topic2.

When the broker later receives (step 406) a message under topic2, it detects that the publisher is amongst the list of interested subscribers and will thus publish the message to the publisher. In response to receipt of such a message, the publisher sends a new message under the first topic, topic1, to the broker, having a null data field (step 408). The broker then overwrites the data portion of the retained topic1 message on its message board with the new blank data message, thereby deleting the retained topic1 message data from its message board (step 410).

Figure 5:
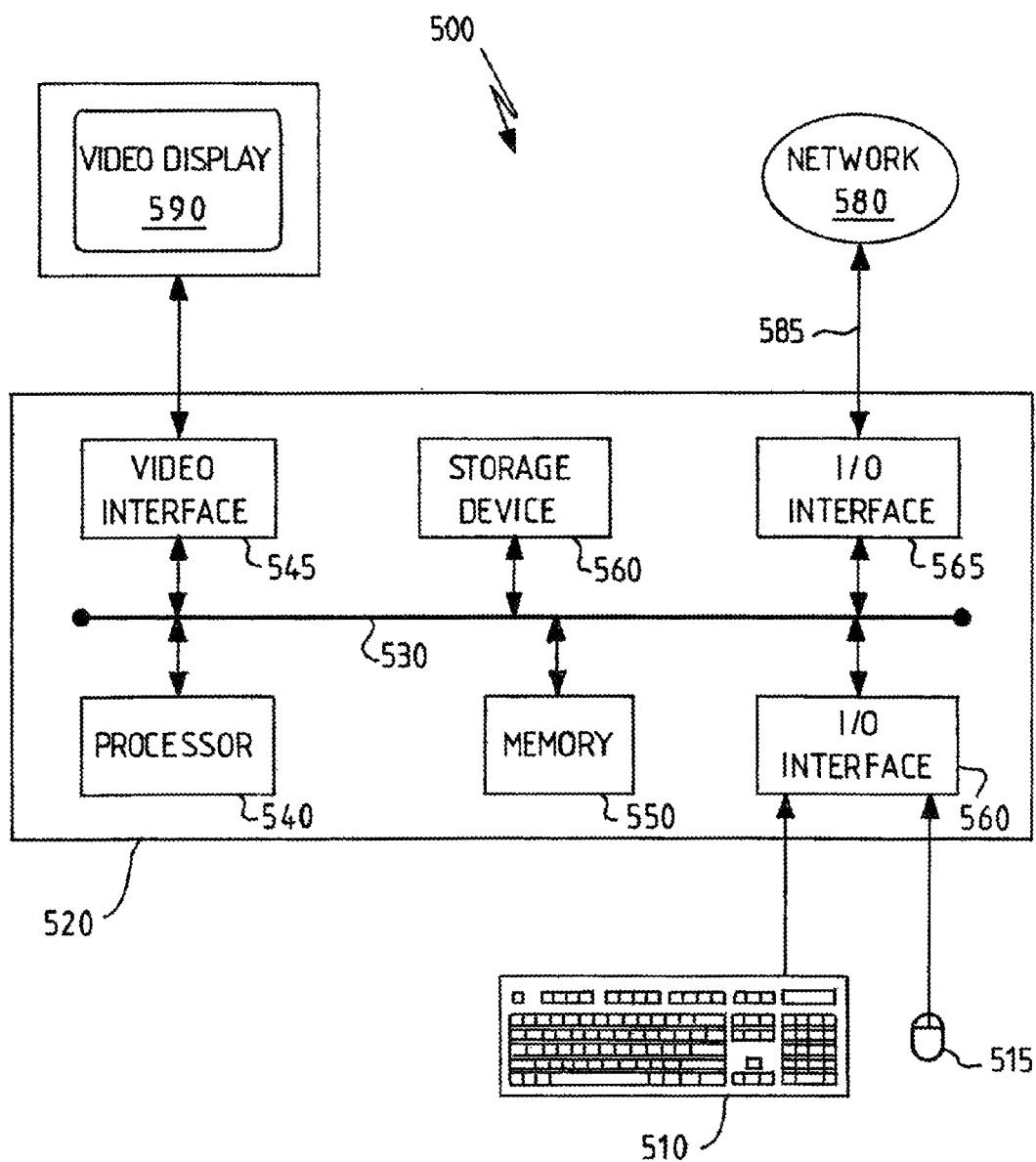
FIG. 5 is a schematic representation of a computer system suitable for performing the techniques described herein.

FIG. 5 is a schematic representation of a computer system of a type that is suitable for executing computer software for implementing the steps of the methods shown and described with reference to the other Figures. Computer software executes under a suitable operating system installed on the computer system 500, and may be thought of as comprising various software code means for achieving the particular steps of the methods.

The components of the computer system 500 include a computer 520, a keyboard 510 and mouse 515, and a video display 590. The computer 520 includes a processor 540, a memory 550, input/output (I/O) interfaces 560, 565, a video interface 545, and a storage device 555.

The processor 540 is a central processing unit (CPU) that executes the operating system and the computer software executing under the operating system. The memory 550 includes random access memory (RAM) and read-only memory (ROM), and is used under direction of the processor 540.

The video interface 545 is connected to video display 590 and provides video signals for display on the video display 590. User input to operate the computer 520 is provided from the keyboard 510 and mouse 515. The storage device 555 can include a disk drive or any other suitable storage medium.

Each of the components of the computer 520 is connected to an internal bus 530 that includes data, address, and control buses, to allow components of the computer 520 to communicate with each other via the bus 530.

The computer system 500 can be connected to one or more other similar computers via an input/output (I/O) interface 565 using a communication channel 585 to a network 580.

The computer software may be recorded on a portable storage medium, in which case, the computer software program is accessed by the computer system 500 from the storage device 555. Alternatively, the computer software can be accessed directly from the network 580 by the computer 520. In either case, a user can interact with the computer system 500 using the keyboard 510 and mouse 515 to operate the programmed computer software executing on the computer 520.

As will be recognized by persons skilled in the relevant art, other configurations or types of computer systems can be equally well used to execute computer software that assists in implementing the techniques described herein, and various alterations and modifications can be made to the techniques and arrangements described by way of example herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for controlling the retention of a published message in a publish/subscribe system comprising a broker system, comprising with said broker system:
   publishing a first message to subscribers to a topic, said first message comprising a first data portion published to subscribers and a header, said header comprising a first topic attribute identifying the first data portion published to the subscribers and a separate stop attribute comprising a second topic attribute;
   storing said first data portion in a computer memory as retained message data;
   receiving a second message for publication to subscribers, said second message comprising a second data portion to be published to the subscribers and said second topic attribute identifying the second data portion;
   determining that said second topic attribute of said second message matches said stop attribute of said first published message; and
   deleting at least said retained message data of said first published message when said second message is received.

2. The method of claim 1, wherein said step of deleting said retained message data of said first published message comprises replacing said message data with a null field.

3. The method of claim 1, further comprising
   determining whether a stop attribute of any other message having message data retained by said broker system matches said second topic attribute of said second message; and,
   in response to finding a match, deleting retained message data for any said other message with a stop attribute matching said second topic attribute of said second message.

4. The method of claim 1, further comprising:
receiving a new message from a publisher;
detecting whether a topic attribute of said new message matches a stop attribute of any retained message; and
deleting said message data of any retained message for which a match is found.

5. The method of claim 1, wherein said step of deleting said retained message data of said first published message comprises sending a replacement message having a null data field for publication.

6. The method of claim 5, further comprising overwriting said retained message data of said first message with said null data field of said replacement message.

7. The method of claim 1, in which said first topic attribute does not identically match said second topic attribute.

8. The method of claim 1, in which said second message comprises a header, the header comprising said second topic attribute, a separate stop attribute, and retaining message data.

9. The method of claim 1, further comprising comparing said separate stop attribute in the first message with said second topic attribute in said second message to determine if the separate stop attribute and the second topic attribute are an identical match.

10. The method of claim 1, in which said separate stop attribute comprising said second topic attribute is received prior to receiving said second message.

11. The method of claim 1, in which said stop attribute identifies a name of a topic for which said broker system has not yet received a message.

12. The method of claim 1, further comprising:
when a publisher sends said first message comprising said stop attribute to said broker system for publication, said publisher also sends a request to said broker system to subscribe to a topic identified by said second topic attribute;
on receipt by said broker system of said first message and said request, said broker system publishes said first message to a set of interested subscribers; and
registers said publisher to receive messages related to said topic identified by said second topic attribute.

13. The method of claim 12, further comprising when said broker system receives said second message comprising said second topic attribute, said broker system detects that said publisher is a subscriber to said topic identified by said second topic attribute and publishes said second message to said publisher.

14. The method of claim 13, further comprising:
determining, by said publisher, that said second topic attribute of said second message matches said stop attribute of said first published message; and
sending, by said publisher, a new message under said topic to said broker system, said new message having a null data field;
in which deleting at least said retained message data comprises overwriting, by said broker system, a data portion of said retained first message with said null data field, thereby deleting said data portion of said retained first message from a message board of said broker system.

15. A message broker data processing apparatus for a publish/subscribe system comprising a plurality of publishing and subscribing applications, the apparatus comprising:
a receiving component for receiving messages from publishers for publication to subscribers, each message for publication to subscribers comprising a message data field as well at least one message attribute, said at least one message attribute identifying a message topic subscribed to by said subscribers and a separate stop attribute;
a data store implemented in a computer memory for storing message data, and any assigned stop attribute, of a received message having a retain attribute;
a matching engine implemented by a computer processor for determining whether said topic of a received message for publication to subscribers matches a stop attribute of any retained message published to said subscribers; and
a deletion component implemented by a computer processor for deleting from the computer memory at least said message data for any retained message for which a match is found by said matching engine.

16. The apparatus of claim 15, further comprising subscription data stored in said data store; said matching engine determining a set of subscribers interested in a message received by said message broker from a publisher, using said subscription data.

17. The apparatus of claim 15, further comprising a processing component for processing received messages to determine whether a received message has a retain attribute.

18. The apparatus of claim 15, wherein said deletion component deletes said message data by deleting all of said retained message from its data store.

19. The apparatus of claim 15, wherein said deletion component deletes said message data by overwriting said message data field of said retained message with a null value.

20. A computer program product for controlling the retention of a published message in a publish/subscribe system, comprising a computer useable storage device having computer executable instructions thereon for executing a method, comprising:
recognizing, with a computer processor executing said computer executable instructions, a stop attribute assigned to a first message, said stop attribute being separate from a topic assigned to said first message, in which said stop attribute comprises a second topic;
publishing, by said computer processor, said first message and retaining message data associated with said first message;
listening, with said computer processor, for a second message having a topic attribute comprising said second topic, said topic attribute matching said stop attribute of said first published message; and
deleting, with said computer processor, at least said retained message data of said first published message when said second message is received.

21. The computer program product of claim 20, wherein said step of deleting said message data of said first published message comprises replacing said message data with a null field.

* * * * *